Nov. 15, 1966     W. T. HOLSER ETAL     3,286,163
METHOD FOR MAPPING A SALT DOME AT DEPTH BY MEASURING THE
TRAVEL TIME OF ELECTROMAGNETIC ENERGY EMITTED FROM
A BOREHOLE DRILLED WITHIN THE SALT DOME
Filed Jan. 23, 1963     3 Sheets-Sheet 1

INVENTORS
WILLIAM T. HOLSER
ROBERT R. UNTERBERGER
STANLEY B. JONES

BY P E Johnston
Ralph L Freeland Jr.
ATTORNEYS

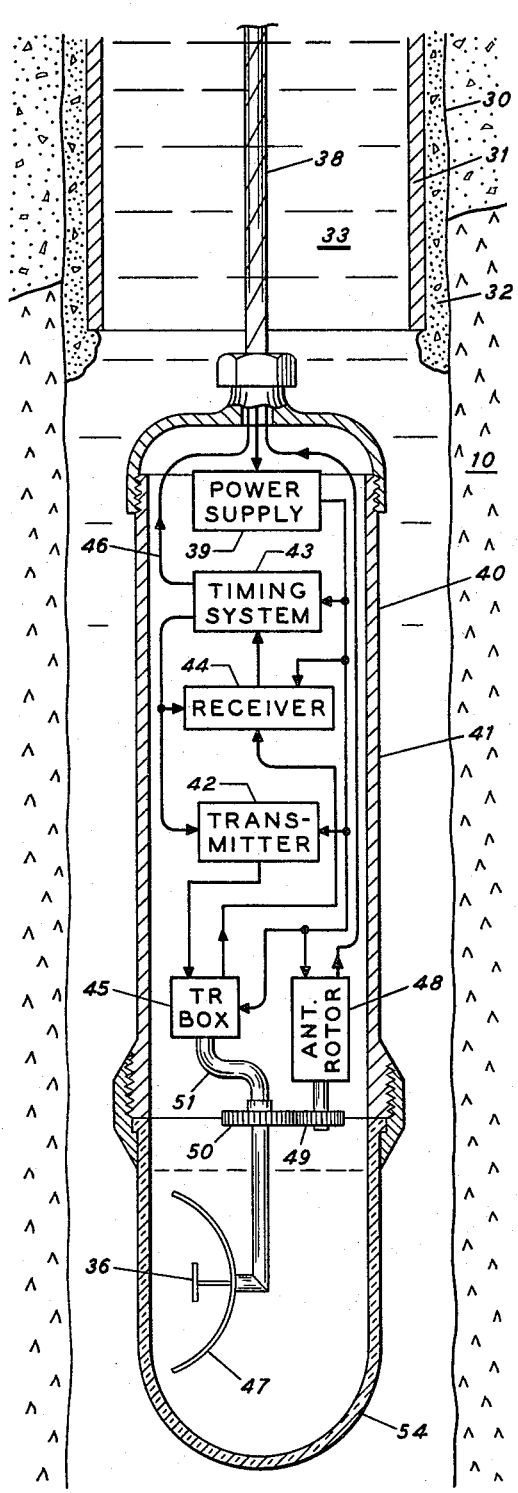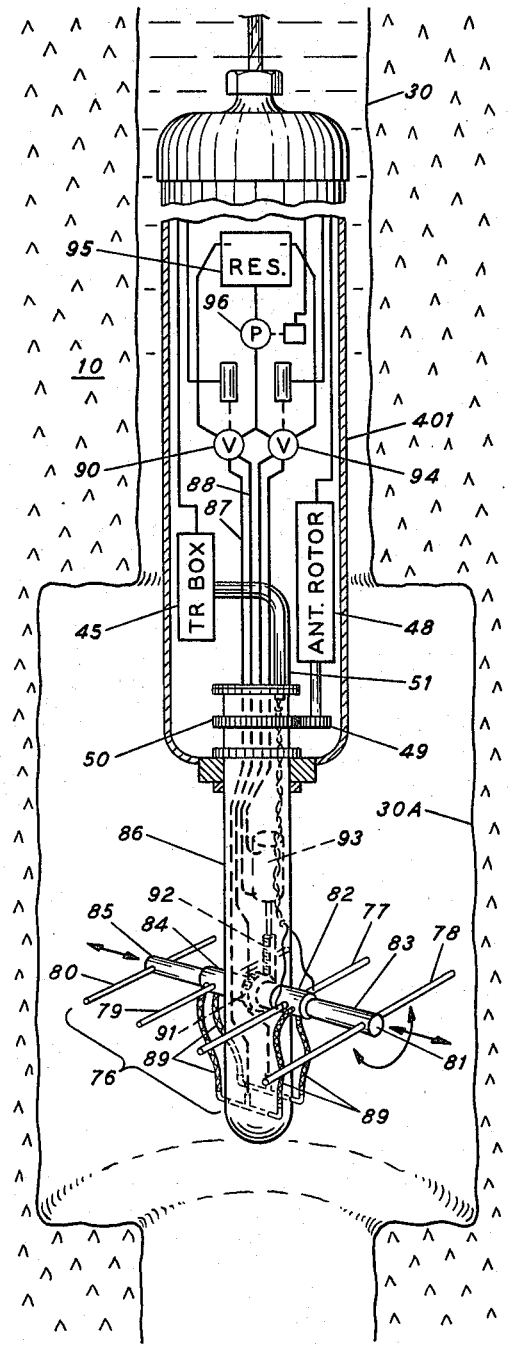
FIG. 3
FIG. 4
INVENTORS
WILLIAM T. HOLSER
ROBERT R. UNTERBERGER
STANLEY B. JONES
BY
ATTORNEYS

INVENTORS
WILLIAM T. HOLSER
ROBERT R. UNTERBERGER
STANLEY B. JONES

United States Patent Office 3,286,163
Patented Nov. 15, 1966

3,286,163
METHOD FOR MAPPING A SALT DOME AT DEPTH BY MEASURING THE TRAVEL TIME OF ELECTROMAGNETIC ENERGY EMITTED FROM A BOREHOLE DRILLED WITHIN THE SALT DOME
William T. Holser, La Habra, and Robert R. Unterberger and Stanley B. Jones, Whittier, Calif., assignors to Chevron Research Company, a corporation of Delaware
Filed Jan. 23, 1963, Ser. No. 253,339
15 Claims. (Cl. 324—6)

This invention relates to a method of exploring for oil around the side of a salt body. More particularly, it relates to a method of mapping sides of a salt body by applying electromagnetic (e.m.) radiation from a well bore in a salt body to measure the distance to the side of the salt body at any desired level.

It is a particular object of this invention to map the sides of a salt body so that the interface between the salt body and the sedimentary formations may be located exactly at a known depth and with this knowledge to direct the drilling of oil wells into the sedimentary formation close to this interface.

In carrying out the method, a borehole is deliberately drilled into the salt body. The borehole is extended to a depth where e.m. radiations, such as those at radio, microwave and infrared frequencies, can be transmitted in known elevation and azimuth directions from the borehole to the interface between the salt body and the sedimentary formations. The time of travel from the well bore to the interface and back to the well bore is then recorded in accordance with the depth, azimuth, and elevation position of the transmitter and receiver, to map three-dimensionally the underground contour or configuration of the salt-sediment interface.

In exploration for oil and gas in the Gulf Coast region, it is known that commercial accumulations are usually present, if at all, in the sedimentary formations directly adjacent to a salt dome. It is generally believed that these accumulations occur because the sedimentary beds are uptilted by the upward intrusion of the salt dome through the sedimentary layers. The upward tilt of the beds at the interface creates a pocket, or trap, where oil and gas can accumulate by gravity separation from other formation fluids. While the general location of a salt dome can be found at the earth's surface by gravity or seismic methods, at other elevations the exact outline of the interface between the salt dome and the sedimentary beds, prior to this invention, could be accurately located only by actual drilling. Very much less accurately, the form of the dome has sometimes been found by refraction seismic prospecting. Even after actually drilling several holes, there is still considerable doubt as to the exact position of the interface between drill holes. Accordingly, it is the primary purpose of this invention to accurately delineate the position of the salt-dome sedimentary-bed interface so that a well bore can be drilled with enough accuracy to penetrate the sedimentary bed at any known distance from the interface.

While it has been proposed heretofore to use e.m. radiations for voice communications through salt bodies, as for example in mines, salt beds, or salt domes, the transmission of single-pulse, radar-type signals for ranging on the salt-dome sedimentary-formation boundary from a narrow elongated borehole in a salt dome has not been proposed heretofore to map this boundary at depth.

In a preferred system for carrying out this invention, the borehole is drilled directly into the salt body to any desired depth. An e.m. signal emitter, or antenna, is then lowered into the borehole and oriented azimuthally to direct radiation toward one side of the salt body. The antenna may, or may not, be oriented in elevation angle also. A transmitter connected to the antenna is then activated to emit periodic pulses from the antenna; the reflections from the salt-dome boundary of said pulses are then detected in the borehole by a receiver that may be connected to the same antenna. The travel time from the borehole to the salt-sediment interface and return is then recorded in accordance with the azimuth and elevation position of the antenna for at least one level in the borehole so that the distance, as represented by the time traveled, can be displayed on the map at that depth to delineate the salt-sediment interface. By multiple plots at different levels, a two- or three-dimensional geologic cross section can be developed and displayed.

An alternate method of carrying out the invention includes use of a frequency-modulated system of e.m. radiation wherein the output signal is continuously sent and received at the borehole by one, or more, different antenna elements. These antenna elements can be similarly positioned in azimuth and depth. The distance to the interface is measured by the frequency difference between the continuously emitted FM signal and the return signal.

In a further alternative system to perform the method of this invention, a continuous vertical record is made in the style of a typical well-log record. In such a system, a nondirective antenna is used, with the signals either pulsed from a single transmitter element, or frequency modulated with at least two antennas. The output is omnidirectional in a plane perpendicular to the borehole axis, with either signal-transmitting system. The distance to the nearest interface is then recorded along the length of the well bore without regard to azimuth orientation. The recorded signal in this method represents the least distance to the side of the salt body. In such a system, the azimuthal direction to the closest side of the salt body is known, as for example where the well bore is drilled near the edge of a salt dome approximately two or three miles in diameter. Thus, the only information required is the range, not the azimuth.

Another embodiment of apparatus to carry out the method of this invention uses light as the e.m. energy source to map the distance to the salt-sedimentary bed interface. For this purpose a laser may be used as a generator of high-power, coherent pulses of infrared, or visible, light which are directed to the interface. The reflected pulses of light are received back in the borehole by an optical lens system and focused on a detector element particularly sensitive to the radiation emitted by the laser.

Desirably, the frequency of e.m. radiation is selected to optimize its transmission through the crystalline structure of the salt forming the body. Other factors, such as pulse length and antenna size, must also be considered. Thus the frequency will be between $10^6$ and $10^{10}$ cycles per second, in the case of radio frequency signals, or, in the case of optical radiation, between $2 \times 10^{13}$ and $10^{15}$ cycles per second (a free space wavelength of 15 to 0.3 microns). These frequencies are selected to take advantage of the e.m. transmission windows that we have found to exist in the crystalline structure of rock salt (halite).

As a further refinement of the method, the salt body is sampled during the drilling process in order to measure its dielectric properties at the frequencies quoted above, including the effect of inhomogeneities, such as inclusions of saturated salt water or anhydrite in the crystalline structure of the salt. In particular, the properties measured are the dielectric constant (or optical index of refraction) and the loss tangent (or optical absorption) over the frequency region mentioned above. If desired, these dielectric properties aid us in selecting optimum frequencies, in selecting coupling fluids to use in the well bore to improve the energy transmission through, into, and out of the salt body, and in converting travel time to distance.

Further objects and advantages of the invention will become apparent from the following detailed description, taken in conjunction with the accompanying drawings, which form a part of this specification.

In the drawings:

FIG. 3 illustrates in greater detail a logging sonde, including an antenna system, useful in the system shown in FIG. 1.

FIG. 4 illustrates an alternate antenna system useful in the embodiment of FIG. 1.

Figures 1, 2:
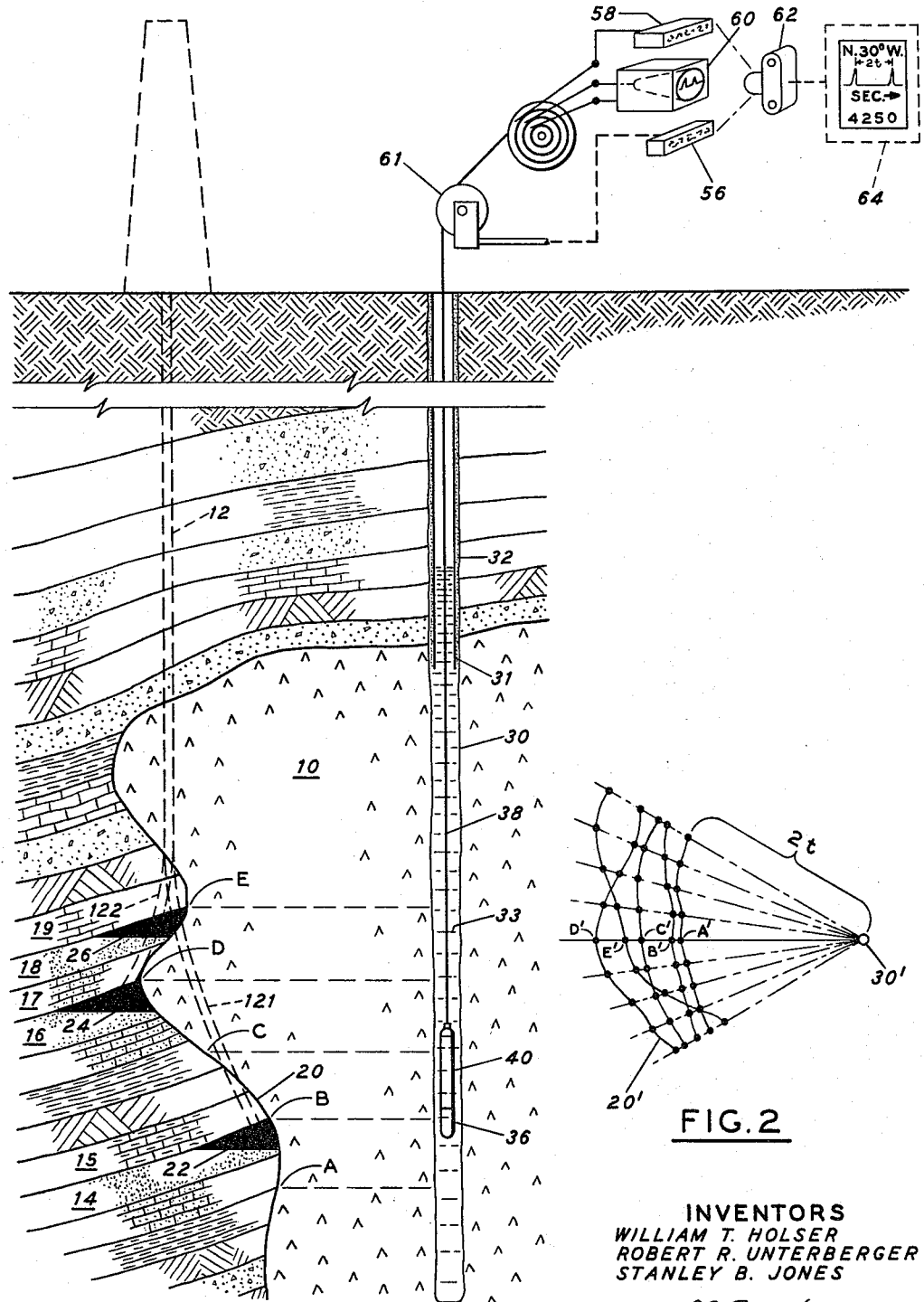
FIG. 1 is a schematic representation of use of the method of this invention to detect and record the distance to the interface between a salt dome and sedimentary formations.
FIG. 2 represents a plot of signals recorded with the arrangement of FIG. 1 at five different levels, indicated as A, B, C, D, and E.

Reference is now made to the drawings. In particular, FIG. 1 schematically indicates use of the method of this invention to map, at depth, the location of the side wall of salt dome 10. The purpose of such mapping, of course, is to locate and direct a proposed well bore, such as 12, into sedimentary beds 14, 16, and 18. As shown, these beds are normally tilted upwardly by the intrusion of salt dome 10 through the beds after they have been laid down horizontally. The salt at the ends of beds 14, 16, and 18 lying against wall 20 of the salt dome, together with the overlying impermeable beds, such as 15, 17, and 19, respectively, form traps for gravity segregation of petroleum as indicated by the reservoirs denoted at 22, 24, and 26. Obviously, if the exact horizontal and vertical location of side wall 20 is known for each of the beds 14, 16, and 18, well bore 12 can be directed as shown by the deviations 121 or 122 to encounter reservoirs 22, 24, or 26.

To map the location of side wall 20 at depth, a borehole 30 is deliberately drilled into the main body of salt dome 10. The exact location of this borehole is not critical, but it will generally be selected by normal surface exploration methods, such as a gravity or seismic survey. It is most desirably located so that it is well within the main body of salt dome 10. Suitably, the minimum distance will be at least a few hundred feet from the well bore to the side wall 20. Well bore 30 may be drilled in any manner to the salt. Preferably then it should be cased with pipe 31 and cemented, as at 32, and the salt drilled dry, as by air drilling. However, the well bore into the salt body can also be drilled by conventional rotary methods using saturated salt water, or oil, if the drilling fluid is replaced at the measuring levels by a suitable low-loss fluid, as indicated at 33.

In the form of apparatus used in FIG. 1, well bore 30 is indicated as being drilled large enough to permit a full range of azimuth motion for an antenna, or director-receiver unit, 36. To position e.m. wave antenna 36, electrical signals are transmitted and received over cable 38, which supports sonde 40 that houses the downhole equipment. Sonde 40, as best seen in FIG. 3, includes an instrument housing 41 that preferably includes a high-frequency transmitter 42 and suitable coupling and timing circuits to send e.m. pulses to antenna 36. Specifically, a timing system 43 controls the switching of antenna 36 periodically from transmitter 42 to receiver 44 by transmit-receive switch (TR box) 45. The output of receiver 44 is then returned to the surface for indication of travel time through timing system 43 and lead 46. Sonde 40 also contains an azimuth control unit to rotate antenna 36. In this embodiment, antenna 36 supported in reflector 47 is turned by antenna rotor 48 through gears 49 and 50. Rotor 48 includes a gyroscope for position reference. The signals pass into and out of antenna 36 through coaxial line 51. To facilitate transmission of e.m. waves from within sonde 40, the lower part of housing 41 is desirably formed of low-absorption material, shaped as randome 54. A power supply indicated as 39 is shown positioned in sonde 40, but of course can be located at the earth's surface if so permitted by the electrical characteristics of cable 38.

Referring again to FIG. 1, the surface recording equipment for mapping the salt-dome side-wall distance to the borehole includes three indicators: for depth, 56; for azimuth, 58; and for distance, 60. Depth indicator 56 shows the mapping depth of antenna 36 in well bore 30. Each map depth is measured by pulley 61; in turn, the position of pulley 61 is shown on indicator 56. The azimuth position of antenna 36 may be in polar coordinates, but in the present embodiment it is indicated as a gyroscope position indicator 58. The distance from borehole 30 to side wall 20 at each mapping depth is then indicated by the time between transmission and reception of pulses of e.m. energy at antenna 36. The travel time is suitably shown on oscilloscope 60. By physically associating depth indicator 56, gyro indicator 58, and oscilloscope 60, the information on all three units can be simultaneously photographed by camera 62. The results of such a simultaneous photograph produce a plate of the type indicated as 64. Plate 64 indicates compass heading, the two-way travel time ($2t$) in microseconds for e.m. signals, and the depth at which antenna 36 was located. With the $2t$ and a conversion factor for time-to-distance for the transmission of e.m. energy, the exact position of each point at five different levels, such as A', B', C', D', and E', can then be plotted as shown in FIG. 2. The connecting lines between each map point, as indicated, represents the location of the interface, or side wall, 20 relative to well bore 30'.

FIG. 3 shows no elevation orientation of the antenna. This may be incorporated if desired. Further, separate receiving and transmitting antennas may be used so as to avoid coupling of the transmitted pulse with the receiver at time of transmission.

It has been found by loss-tangent measurements on samples of halite taken from actual salt domes that there are particular frequencies at which the method of this invention will operate with maximum efficiency. Specifically, it is known that in crystallization of salt to form a salt dome, frequently small pockets of the original brine are left. These pockets of saturated salt water will have a dimension of a few millimeters, but seldom include large amounts, or large pockets, of such saturated salt water. It has also been found that generally an electrically conducting layer is present at the interface of a salt dome and the sedimentary beds. This occurs because water is present in most sedimentary rock beds, and where this water touches the side of the salt dome it is necessarily saturated salt water; this water then creates an ideal reflector for e.m. waves at the prescribed frequencies. Accordingly, e.m. waves will travel through the relatively homogeneous crystalline salt body and return by reflection from this conducting surface. We have also found, as mentioned above, that there is a "window" for e.m. radiations, as measured by the low value of loss tangents of actual halite samples, that extends over a range of from low frequency to $10^{11}$ cycles per second. A similar "window" for e.m. energy in the infrared region occurs at $2 \times 10^{13}$ to $10^{15}$ cycles per second (corresponding to a free space wavelength of 15 to 0.3 microns). This "window" has a minimum at about $10^{14}$ cycles per second.

FIG. 4 illustrates an alternate antenna system useful in directing e.m. energy to the salt-sedimentary bed interface. It will be noted that borehole 30 is shown to be enlarged as at 30A. This indicates that at selected elevations, such as at depth A in FIG. 1, the borehole 30 is increased in diameter, as by underreaming or other drilling techniques. The purpose of this enlargement is to permit a collapsible antenna to be opened at the selected depth and rotated in azimuth. In FIG. 4, antenna 76 is constructed as a yagi array in which the active element 77 and the passive elements 78, 79, and 80 are moved into operating positions on shaft 81 by an electrohydraulic system. The passive elements include a reflector 78 and two directors 79 and 80. Only the antenna element 77, which is preferably a half wavelength of the signal frequency, has electrical connections. The elements of the array are individually supported on shaft 81 by sections 82, 83, 84, and 85, which are formed as hydraulic pistons and cylinders. The diameters of these sections permit them to nest against center post 86 when in their retracted positions. The sections of shaft 81 are expanded relative to each other and to center post 86 by hydraulic fluid supplied through lines 87 and 88 and hoses 89 under the control of valve 90 in sonde 401. In the collapsed position, antenna elements 77, 78, 79, and 80 are turned to lie parallel to the axis of sonde 401. To turn the elements into this position, shaft 81 is rotated by sector gear 91, which is secured to section 82. Ratchet 92 rotates sector gear 91, under the control of servo motor 93 and valve 94. If desired for directional mapping, antenna system 76 may of course be energized with the array erected in either a vertical or a horizontal plane, or any intermediate angle. As in the embodiment of FIG. 3, the azimuth position of post 86 and antenna array 76 is controlled by antenna rotor 48 and gears 49 and 50. To operate the hydraulic units, fluid is supplied from a reservoir 95 to control valves 90 and 94 by pump 96. If desired, post 86, or support shaft 81, can be tilted to scan in elevation as well as azimuth.

Figure 5:
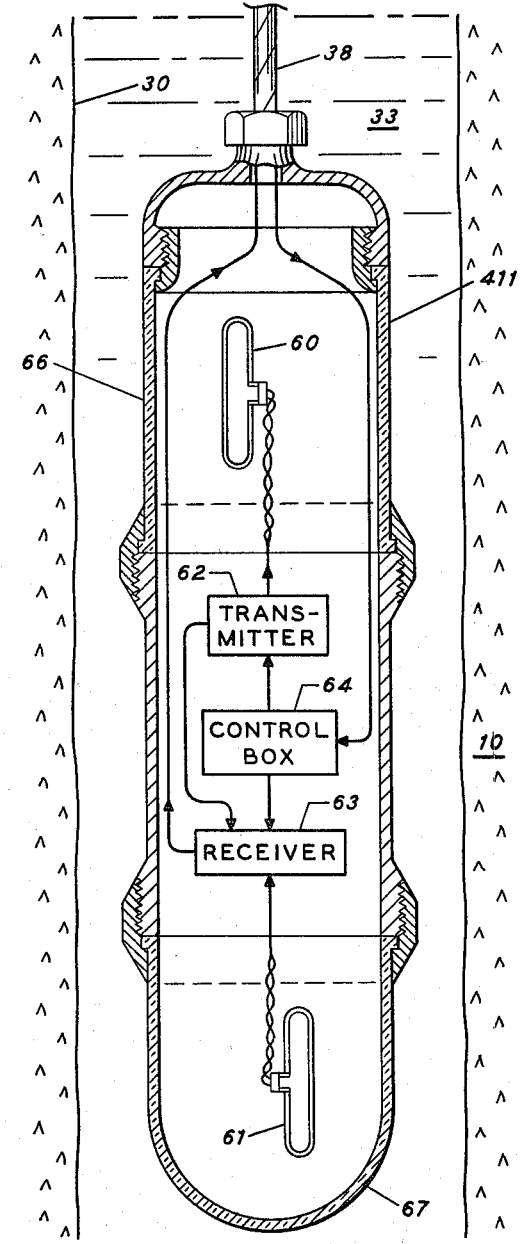
FIG. 5 illustrates an alternate system useful in an arrangement similar to FIG. 1 for continuously recording the minimum distance from the borehole to the side of the salt dome, but which does not require means to indicate azimuth positions. The antenna pattern is omnidirectional in the horizontal plane, as opposed to FIG. 1, where the antennas are directional in at least the horizontal plane.

FIG. 5 illustrates an alternate form of apparatus for carrying out the method of the invention. In this embodiment, the e.m. energy need not be pulsed. As there shown, a folded dipole transmitting antenna 60 is mounted in a position in the upper end of logging sonde 411. As distinguished from the arrangement of FIGS. 1 and 3, logging sonde 411 and dipole transmitting antenna 60 are arranged to continuously traverse borehole 30 on cable 38, and the e.m. energy is frequency modulated. Thus, e.m. waves are continuously emitted from antenna element 60. A similar dipole element 61 is mounted in a fixed position as a receiving antenna in the lower end of sonde 411. In this system, the signals received after reflection from the salt dome edge will differ in frequency from those being transmitted at the time of reception; the longer the travel time, the larger the frequency difference. This frequency difference is then interpreted in terms of the distance from borehole 30 to the nearest portion of side wall 20 of the salt dome at the mapping depth. The general position of side wall 20 is known from surface geophysics and geological measurements. Thus, the azimuthal direction can usually be inferred if the dome has a large diameter, e.g., several miles. In such a system, the location of the side wall is mapped as a vertical section on a chart moved in accordance with depth, as in conventional well logging practice, rather than as a detailed two- or three-dimensional plot. This system is most useful where the borehole in the salt is known to be near one side of the salt dome and the salt dome is of considerable volumetric extent.

As indicated in FIG. 5, transmitting antenna element 60 is coupled to transmitter 62. Receiving antenna 61 is similarly coupled to receiver 63. Frequency modulation of the transmitter is controlled by control box 64. It will be noted that the side walls of sonde 411 include sections 66 and 67 around antenna elements 60 and 61, respectively, which are low-loss dielectrics (radomes) for the frequencies emitted by the transmitter. The receiver detects the instantaneous frequency difference between the transmitted and the received signal and sends this to the surface as an indication of range (distance).

It will, of course, be understood that elevation directing means, like those of FIG. 3 or 4, can be used with elements 60 and 61. In this way, the frequency-modulated system of FIG. 5 can be used to measure distance for mapping the salt-sediment interface in detail. On the other hand, pulsed transmitting and receiving signal systems can be used with the arrangement of FIG. 5, if suitable timing circuits are used and the direction of the interface is not required.

One of the problems encountered in transmitting e.m. energy in a borehole, such as 30, is coupling between the antenna element and the salt body itself. This coupling can be improved by first sampling the salt body and then measuring the complex dielectric constant $K^* = K' - jK''$ of the salt. In this formula, $K^*$ is the complex relative permittivity of the material; $K'$ is the real part of the relative permittivity and is also the dielectric constant; and $jK''$ is the imaginary part of the relative permittivity and is related to the attenuation or the loss of e.m. energy in the transmission of e.m. waves through salt. In coupling the antenna element and the salt body, it is the dielectric constant of the materials that is important. From a knowledge of the $K'$ of the salt, a material such as oil, or fused salts, can be selected so that the salt and the material will have similar dielectric constants at the operating frequency. This material is then positioned in the well bore, if a fluid, or used to pack the antenna element, as for a fluid or a solid, so that coupling between the antenna element and teh salt body is greatly improved.

Figure 6:
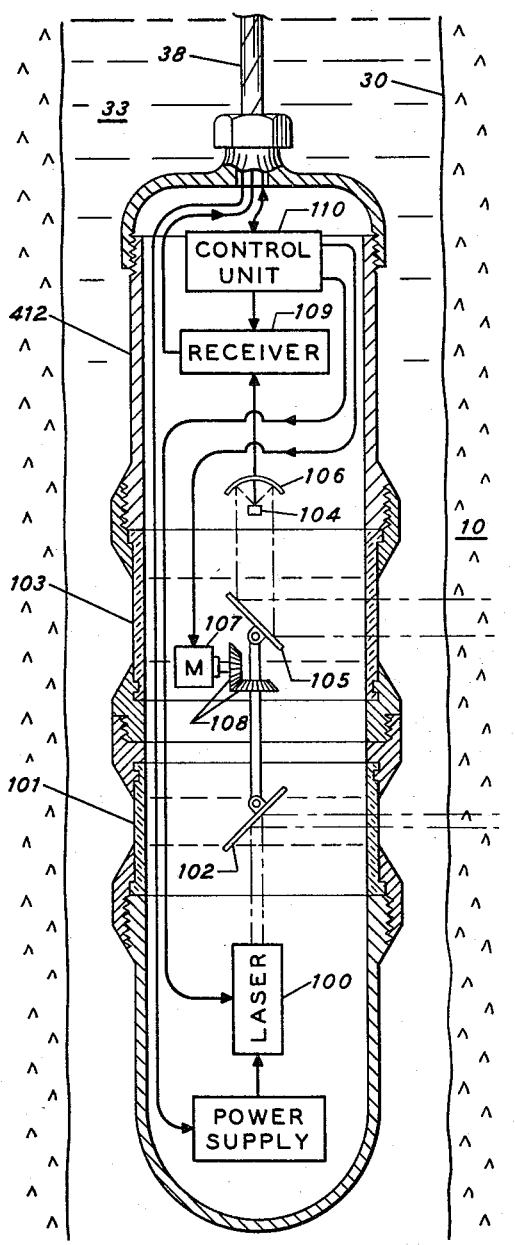
FIG. 6 shows an alternate transmitting and receiving system in an arrangement similar to FIG. 1, but which uses coherent light frequencies.

With an infrared system, the transmitter may be of the laser type and the coherent light directed through a transmitting sonde housing having transparent windows at the wavelength transmitted, such as quartz, through the borehole fluid 33 and into the salt. The received signal comes back through these interfaces in a similar fashion. A system of this type is illustrated in FIG. 6, where laser element 100 is shown emitting light through window 101 in the side wall of sonde 412 in borehole 30 by mirror 102 into salt 10. The receiving element, desirably an optical, or infrared-sensitive, device 104, is similarly coupled to the salt body through window 103 by means of plane mirror 105 and focusing mirror 106. Motor 107 rotates mirrors 102 and 105 by means of gears 108 to produce azimuth scanning. An example of one form of optical pulse echo system usable in transmitting and receiving such frequencies is shown in Bjornson Patent 3,053,134. Signals from laser 100 and receiver 109 are regulated by control unit 110. The same information as that recorded in the embodiment of FIG. 1 is also recorded at the earth's surface, using this embodiment.

Ideally, the lower frequency e.m. radiation will be used to map salt dome flanks at distances of several hundreds or thousands of feet, whereas the infrared frequencies will be used when the distances are shorter, or high resolution in range accuracy and detail is needed. If desired, both instruments of the types shown in FIGS. 3 and 6 may be operated simultaneously in the well bore to provide two separate ranges. Such a system is particularly useful if the distance to the interface is substantially unknown. Where distances are short but optical radiation is too highly attenuated, an FM system is preferable.

As mentioned above, small crystals of anhydrite are one of the principal impurities in the salt rock. For apparatus of the type shown in FIG. 6, designed for the optical region, optical scattering from these inclusions of anhydrite may be minimized by choosing a frequency such that the index of refraction of the anhydrite is nearly the same as that of the pure salt. Such a choice is possible because the variation of the index of refraction with frequency is greater for anhydrite than it is for salt, and they will be equal at about $6 \times 10^{13}$ cycles per second.

Transfer of e.m. energy from the antena into the salt body through the volume of the borehole and any nearby fractured salt may be improved by placing material between the antenna and the body that will reduce scattering at the several interfaces. This material is selected to have a dielectric constant that will match the dielectric constant of the salt body in the range of frequencies being transmitted and received. Suitable dielectric fluids can be made for this purpose by dissolving a liquid that has a higher dielectric constant at the selected frequency in one that has a lower dielectric constant at the same frequency.

Although the foregoing description has been given with particular reference to mapping the interface between a salt dome and sedimentary beds, it is equally useful in locating the boundaries in other salt bodies, such as salt beds, or other highly resistive geological formations containing little or no water.

In the preferred method of practicing the invention, it is stated above that the well bore is drilled deliberately into the salt body. Sometimes, such as where an oil well is being drilled adjacent the flank of a salt dome, the well bore may inadvertently enter the salt body. The distance from the well bore to the flank would then not be known. If this happens, such a well may also be used to locate the flank with this method.

Various modifications in the method described above may be made without departing from the inventive concept disclosed. All such modifications falling within the scope of the appended claims are intended to be included therein.

We claim:
1. The method of approximating the distance to a plurality of flanks of a salt body at a plurality of levels from a known location within said body which comprises drilling a borehole into said salt body to a predetermined depth, positioning at depth an electromagnetic signal generator in said borehole, azimuthally orienting a directional antenna system within said borehole in sequence toward said flanks of said salt body, coupling in sequence the output of said electromagnetic generator to said antenna system, energizing in sequence said generator to emit pulses periodically from said antenna system toward said flanks of said salt body at a frequency within a frequency range from $10^6$ to $10^{10}$ cycles per second and from $2 \times 10^{13}$ to $10^{15}$ cycles per second, receiving in sequence in the borehole the reflections of said electromagnetic pulses from said flanks of said salt body at said antenna system, and recording in sequence at the earth's surface the time for said electromagnetic pulses to travel between said borehole to said flanks of said salt body and return to said borehole in accordance with the azimuth position of said antenna system in said borehole at said plurality of levels whereby the distance represented by said time may be displayed on a three-dimensional map to delineate the location of said flanks of said salt body at a known depth in the earth over an azimuthal dimension at least greater than that mappable from an antenna system positioned in a borehole exterior of said salt body.

2. A method in accordance with claim 1, in which the drilling of said borehole includes enlarging at least a portion of the borehole at said predetermined depth in the salt body and said azimuthally orienting said directional antenna system includes positioning transverse to the axis of said borehole directional antenna, and rotating said antenna in its erected position throughout substantially 360° relative to the borehole axis.

3. A method in accordance with claim 2 in which said antenna element is coupled to said body by a medium having substantially the same dielectric constant at the operating electromagnetic frequency as the salt of said body.

4. The method of approximating the distance to the side of a salt body at a plurality of levels from a known location within said body which comprises drilling a borehole into said salt body to a predetermined depth, positioning an electromagnetic signal generator in said borehole, orienting an electromagnetic radiator within said borehole toward one side of said salt body, coupling the output of said electromagnetic generator to said radiator, energizing said generator to emit pulses periodically from said radiator toward said side of said salt body at a frequency within a frequency range from $10^6$ to $10^{10}$ cycles per second and from $2 \times 10^{13}$ to $10^{15}$ cycles per second, receiving in said borehole the reflections of said electromagnetic pulses from said side of said salt body, and recording at the earth's surface the time for said electromagnetic pulses to travel between said borehole to said side of said salt body and return to said borehole at said plurality of levels whereby the distance represented by said time may be displayed on a map to delineate the location of said side of said salt body at a known depth in the earth.

5. The method of locating a prospective drilling site for an oil well above the sedimentary formations surrounding a salt body which comprises drilling a borehole into the salt body from the earth's surface, sampling said salt body to measure a dielectric property of the crystalline structure of said salt, positioning an electromagnetic signal generator in said well bore, orienting an antenna within said well bore, positioning a material having a dielectric constant substantially equal to that of the sample from said salt body between said antenna element and said body, coupling the output of said electromagnetic generator to said antenna element, energizing said generator to emit signals from said antenna toward a side wall of said salt body through said material at a frequency within a frequency range from $10^6$ to $10^{10}$ cycles per second and from $2 \times 10^{13}$ to $10^{15}$ cycles per second, receiving the reflected signals at said antenna, and recording at the earth's surface the time for said electromagnetic signals to travel between said well bore to the side wall of said salt body and return to said well bore at said point whereby said time may be displayed on a map to delineate the location of the side wall of said salt body at a known depth in the earth.

6. The method of measuring the distance from a known point within a salt body to the side walls thereof which comprises drilling a borehole into said salt body, positioning an electromagnetic transmitting element in said borehole at said known depth, at least periodically supplying electromagnetic radiation energy to said transmitting element, said radiation energy having a frequency within a range of $10^6$ to $10^{15}$ cycles per second and within a range of about $10^{10}$ to $2 \times 10^{13}$ cycles per second, directionally orienting said transmitting element, and at least periodically receiving radiation emitted from said transmitting element reaching the side wall of said salt body and returning to a receiving element positioned in said borehole, and recording the direction and two-way travel time of said transmitted electromagnetic energy whereby the distance to the side wall of said salt body may be determined from the two-way travel time of the radiation and the index of refraction of the salt body for the frequency of radiation.

7. A method in accordance with claim 6 in which said electromagnetic radiation has a frequency between $2 \times 10^{13}$ and $10^{15}$ cycles per second (15 microns to 0.3 microns), said transmitting element is a coherent electromagnetic wave generator, and said receiving element is a sensitive detector for the said frequency.

8. A method in accordance with claim 7 in which said electromagnetic radiation has a frequency selected to make the dielectric constant of the salt body without impurities equal to the dielectric constant of the impurities in said body.

9. A method in accordance with claim 6 in which said electromagnetic radiation energy has a frequency of between $10^6$ and $10^{10}$ cycles per second.

10. The method of mapping the location of the flank of a salt dome at a known depth in the earth which comprises drilling a well bore into the salt dome and extending to a predetermined depth, positioning an electromagnetic energy transmitting and receiving system in said well bore at said depth, supplying and receiving electromagnetic energy at a frequency within a frequency range from $10^6$ to $10^{10}$ cycles per second and from $2 \times 10^{13}$ to $10^{15}$ cycles per second for transmission and reflection through said salt dome at said depth, and recording at the earth's surface an indication of the two-way travel time of said electromagnetic energy to and from said flank at said mapping depth.

11. A method in accordance with claim 10 in which said electromagnetic energy is continuously emitted, but frequency modulated from and received by antenna elements, and said recording of said two-way travel time is the distance to the closest portion of said flank.

12. The method in accordance with claim 11 wherein said frequency-modulated electromagnetic energy is directed in azimuth and said two-way travel time is recorded relative to the azimuthal direction of antenna elements in said well bore.

13. A method in accordance with claim 10 wherein emission of said electromagnetic energy is pulsed.

14. A method in accordance with claim 13 wherein pulses of electromagnetic energy are directed into a confined azimuthal path and the travel time for reflected pulses is recorded in accordance with the orientation of said azimuthal path relative to said well bore.

15. A method in accordance with claim 10 in which said electromagnetic radiation is omnidirectionally emitted, and said recording of said two-way travel time is the distance to the closest portion of said flank.

References Cited by the Examiner
UNITED STATES PATENTS

| | | | |
|---|---|---|---|
| 2,021,943 | 11/1935 | McCollum | 181—0.5 |
| 2,077,707 | 4/1937 | Melton | 324—6 X |
| 2,139,460 | 12/1938 | Potapenko | 324—6 X |
| 2,334,475 | 11/1943 | Claudet | 324—6 X |
| 2,455,940 | 12/1948 | Muskat et al. | 324—6 |
| 2,657,380 | 10/1953 | Donaldson | 324—6 X |
| 2,766,422 | 10/1956 | Carbonetto | 324—6 |
| 2,874,347 | 2/1959 | Southwick | 324—1 |
| 2,992,325 | 7/1961 | Lehan | 324—6 X |

G. R. STRECKER, *Assistant Examiner.*

WALTER L. CARLSON, *Primary Examiner.*

UNITED STATES PATENT OFFICE
CERTIFICATE OF CORRECTION

Patent No. 3,286,163　　　　　　　　　　　　November 15, 1966

William T. Holser et al.

It is hereby certified that error appears in the above numbered patent requiring correction and that the said Letters Patent should read as corrected below.

Column 3, line 30, after "system" insert -- useful --; column 4, line 13, for "randome" read -- radome --; column 8, line 53, for "within" read -- without --.

Signed and sealed this 12th day of September 1967.

(SEAL)
Attest:

ERNEST W. SWIDER　　　　　　　　　　　　EDWARD J. BRENNER
Attesting Officer　　　　　　　　　　　　　Commissioner of Patents